(12) United States Patent
Takeuchi et al.

(10) Patent No.: US 8,039,247 B2
(45) Date of Patent: Oct. 18, 2011

(54) METHOD OF FORMING PLANAR LIPID DOUBLE MEMBRANE FOR MEMBRANE PROTEIN ANALYSIS AND APPARATUS THEREFOR

(75) Inventors: Shoji Takeuchi, Shibuya-ku (JP); Hiroaki Suzuki, Setagaya-ku (JP); Hiroyuki Noji, Kawasaki (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 1321 days.

(21) Appl. No.: 10/586,331

(22) PCT Filed: Jan. 19, 2005

(86) PCT No.: PCT/JP2005/000558
§ 371 (c)(1),
(2), (4) Date: Jan. 4, 2007

(87) PCT Pub. No.: WO2005/071405
PCT Pub. Date: Aug. 4, 2005

(65) Prior Publication Data
US 2007/0161101 A1 Jul. 12, 2007

(30) Foreign Application Priority Data
Jan. 21, 2004 (JP) ................................. 2004-012995

(51) Int. Cl.
*C12M 1/34* (2006.01)
*G01N 1/28* (2006.01)
(52) U.S. Cl. .................................. 435/287.1; 437/2.11
(58) Field of Classification Search .................. None
See application file for complete search history.

(56) References Cited

U.S. PATENT DOCUMENTS
2003/0146091 A1* 8/2003 Vogel et al. .............. 204/403.01

FOREIGN PATENT DOCUMENTS
JP 02 059075 2/1990
JP 2002 508516 3/2002

OTHER PUBLICATIONS

Suzuki et al ("Planar Lipid Membrane Array for Membrane Protein Chip," 17th IEEE International Conference of Microelectro Mechanical Systems, pp. 272-275, Maastricht MEMS 2004 Technical Digest, Jan. 25-29, 2004).*
Suzuki et al., "Micro Ryuro O Mochiita Shishitsu Heimen No Saikosei". Kagaku to Micro Nano System Kenkyukai Koen Yoshishu, 8th edition, p. 61, 2003.
Suzuki et al., "Planar Lipid Membrane Array for Membrane Protein Chip", IEEE International Conference on Micro Electro Mechanical Systems, pp. 272-275, Jan. 25-29, 2004.

* cited by examiner

Primary Examiner — David J Blanchard
Assistant Examiner — Suzanne Ziska
(74) Attorney, Agent, or Firm — Oblon, Spivak, McClelland, Maier & Neustadt, L.L.P.

(57) ABSTRACT

To provide a method of forming a planar lipid-bilayer membrane for membrane protein analysis, by which downsizing, simplifying, and multichanneling of a device therefore are achieved. A planar lipid-bilayer membrane 24 is formed by filling a microchannel 12 with a buffer solution 18, the microchannel 12 disposed under a horizontal partition wall 13 having an aperture 14; applying a small amount of a lipid solution 20 as a droplet on the aperture 14 filled with the buffer solution 18 to thereby form a thin layer 21 of the lipid solution in a chamber, the chamber 17 being formed at a position corresponding to the aperture 14 and provided with a liquid trap 15 inside the chamber; and applying a buffer solution 23 as a droplet to the chamber 17 from the upper side of the chamber.

20 Claims, 8 Drawing Sheets

(a)

(b)

FUSION

METHOD OF FORMING PLANAR LIPID DOUBLE MEMBRANE FOR MEMBRANE PROTEIN ANALYSIS AND APPARATUS THEREFOR

TECHNICAL FIELD

The present invention relates to methods of forming planar lipid-bilayer membranes for membrane protein analysis and devices therefor. The planar lipid-bilayer membranes are used in fields such as biotechnology, biochips, membrane protein analysis, drug discovery screening, and biosensors.

BACKGROUND ART

As typical methods for producing planar lipid-bilayer membranes used in analysis of membrane proteins such as ion channels, painting method and Langmuir-Blodgett method (LB method) are conventionally known. Both methods are of forming a planar lipid-bilayer membrane in an aperture opened in a Teflon (registered trademark) sheet in a chamber filled with a buffer solution. The aperture has a size of several-hundred microns. In the painting method, a lipid solution is applied to the aperture with a brush. The LB method utilizes the fact that a monomolecular layer of a lipid molecule is formed on the surface of a solution. In this method, a planar lipid-bilayer membrane is formed by gradually raising the solution surface level at both sides of a Teflon (registered trademark) sheet in a chamber.

FIG. 1 is a schematic diagram showing a method of forming a planar lipid-bilayer membrane by the LB method.

In the drawing, a reference numeral 1 denotes a Teflon (registered trademark) sheet, a reference numeral 2 denotes an aperture formed in the Teflon (registered trademark) sheet 1, a reference numeral 3 denotes a solution on the surface of which a monomolecular layer 4 of lipid is formed, and a reference numeral 5 denotes a buffer solution. A planar lipid-bilayer membrane 6 is formed by gradually raising the surface level of the solution 3 at both sides of the Teflon (registered trademark) sheet 1 in a chamber.

Patent Document 1: Japanese Unexamined Patent Application Publication No. 02-35941
Patent Document 2: Japanese Unexamined Patent Application Publication No. 05-253467
Patent Document 3: Japanese Unexamined Patent Application Publication No. 07-241512
Patent Document 4: Japanese Unexamined Patent Application Publication No. 2002-505007
Patent Document 5: Japanese Unexamined Patent Application Publication No. 2003-511679
Patent Document 6: Japanese Patent Application No. 2003-329667
Non-Patent Document 1: H. Zhu, et al., "Global Analysis of Protein Activities Using Proteome Chips", Science, Vol. 293, pp. 2101-2105, 2001.
Non-Patent Document 2: B. Alberts, et al., "Molecular Biology of the Cell; 4th Ed.", Garland Science, 2002.
Non-Patent Document 3: C. Miller, ed., "Ion Channel Reconstitution", Plenum Press, 1986.
Non-Patent Document 4: T. Ide and T. Yanagida, "An Artificial Lipid Bilayer Formed on an Agarose-Coated Glass for Simultaneous Electrical and Optical Measurement of Single Ion Channels," Biochem. Biophys. Res. Comm., 265, pp. 595-599, 1999.
Non-Patent Document 5: T. Ide, Y. Takeuchi, and T. Yanagida, "Development of an Experimental Apparatus for Simultaneous Observation of Optical and Electrical Signals from Single Ion Channels," Single Molecules, 3(1), pp. 33-42, 2002.
Non-Patent Document 6: J. T. Groves, N. Ulman, and S. G. Boxer, "Micropatterning Fluid Lipid Bilayers on Solid Supports," Science, Vol. 275, pp. 651-653.
Non-Patent Document 7: M. Mayer, et al., "Microfabricated Teflon Membranes for Low-Noise Recording of Ion Channels in Planar Lipid Bilayers," Biophys. J., Vol. 85, pp. 2684-2695, 2003.
Non-Patent Document 8: Fertig et al., "Microstructured Glass Chip for Ion-Channel Electrophysiology," Phys. Rev. E., Vol. 64, 040901(R), 2001.
Non-Patent Document 9: H. Suzuki, H. Noji, S. Takeuchi, SEIBUTSU BUTSURI (Biophysics), Vol. 43, SUPPLEMENT 1, p. S118, B374, August 2003

DISCLOSURE OF INVENTION

Both methods mentioned above require large chambers of about several centimeters in size. Therefore, the dead volumes are large and microscopic observation cannot be performed. Additionally, in these methods, when a plurality of planar lipid-bilayer membranes are simultaneously formed in a channel by providing a plurality of apertures, adjacent apertures (planar lipid-bilayer membranes) are electrically connected to each other through a buffer solution in the channel and the electrophysiological measurement of each membrane is difficult.

Furthermore, basically, only one planar lipid-bilayer membrane is formed at a time. Therefore, multichannel analysis is impossible. In addition, these methods require an experienced skill and their repeatability is low.

The present inventors have already proposed a method of forming an artificial lipid membrane and a device therefor (the Patent Document 6), in which a first and second microchannels are formed and the flow of a lipid solution in the second microchannel is controlled so that a planar lipid-bilayer membrane is formed.

In the method, firstly, the first microchannel is filled with a buffer solution (aqueous solution), and then the second microchannel having an aperture is filled with a lipid solution. Then, the lipid solution is discharged by infusing air to the second microchannel. A part of the lipid solution remains at the interface of the buffer solution in the aperture at this step. Then, the buffer solution is introduced into the second microchannel to discharge the air. The air is replaced with the buffer solution and a planar lipid-bilayer membrane is thereby formed in the aperture.

However, in this method, the number of the steps for the formation of a planar lipid-bilayer membrane is large and the process is complicated. In addition, it is difficult to control the thickness of the planar lipid-bilayer membrane.

Recently, it has been required to apply different kinds of reagents or different kinds of proteins to a multi-chamber device and to measure their reaction/binding. However, no existing technologies meet such requirement.

Under such circumstances, it is an object of the present invention to provide a method of forming a planar lipid-bilayer membrane array for membrane protein analysis, which is capable of downsizing, simplifying, and multichanneling of a device therefor.

The object of the present invention is achieved by the following aspects:

[1] In a method of forming a planar lipid-bilayer membrane for membrane protein analysis, a microchannel is filled with a buffer solution. The microchannel is disposed under a horizontal partition wall having an aperture. A chamber is formed at a position corresponding to the aperture and is provided with a liquid trap on the partition wall inside the chamber. A small amount of a lipid solution is applied as a droplet to the aperture filled with the buffer solution to form a thin layer of the lipid solution. A buffer solution is applied as a droplet to the chamber from the upper side of the chamber to thereby form a planar lipid-bilayer membrane.

[2] In the method of forming a planar lipid-bilayer membrane for membrane protein analysis according to the aspect [1], the thickness of the thin layer of the lipid solution is controlled.

[3] In the method of forming a planar lipid-bilayer membrane for membrane protein analysis according to the aspect [1] or [2], the buffer solution contains a liposome (spherical vesicle of a lipid-bilayer membrane) incorporated with an objective membrane protein. The liposome is fused with the planar lipid-bilayer membrane to incorporate the membrane protein into the planar lipid-bilayer membrane.

[4] In the method of forming a planar lipid-bilayer membrane for membrane protein analysis according to the aspect [1], a plurality of the chambers are integrally formed.

[5] In the method of forming a planar lipid-bilayer membrane for membrane protein analysis according to the aspect [4], the plurality of the chambers are formed in an array.

[6] In the method of forming a planar lipid-bilayer membrane for membrane protein analysis according to the aspect [4] or [5], liposomes each containing a different protein are each applied to a different chamber, and different kinds of proteins are simultaneously measured.

[7] In the method of forming a planar lipid-bilayer membrane for membrane protein analysis according to the aspect of [4] or [5], the reaction/binding of different kinds of reagents or different kinds of proteins in each of the chambers are simultaneously measured.

[8] In the method of forming a planar lipid-bilayer membrane for membrane protein analysis according to the aspect [4] or [5], the temperature of each chamber is independently controlled. Liposomes each containing a different protein are each applied to a different chamber, and the proteins different in temperature are simultaneously measured.

[9] A device for forming a planar lipid-bilayer membrane for membrane protein analysis includes a substrate, a partition wall disposed over the substrate so as to be parallel to the substrate, a microchannel defined by the substrate and the partition wall, a chamber provided with an aperture formed on the partition wall and a liquid trap formed at the periphery of the aperture, and a microinjection device for applying droplets of a lipid solution and a buffer solution to the chamber from the upper side of the chamber.

[10] The device for forming a planar lipid-bilayer membrane for membrane protein analysis according to the aspect [9] further includes a first thin-film electrode disposed on the substrate at the position corresponding to the chamber and a second thin-film electrode disposed near the liquid trap.

[11] In the device for forming a planar lipid-bilayer membrane for membrane protein analysis according to the aspect [9] or [10], the partition wall has a channel connected to the liquid trap for controlling the thickness of the layer of the lipid solution.

[12] In the device for forming a planar lipid-bilayer membrane for membrane protein analysis according to the aspect [9] or [10], a plurality of the chambers are integrally formed.

[13] In the device for forming a planar lipid-bilayer membrane for membrane protein analysis according to the aspect [12], the plurality of the chambers are formed in an array.

[14] In the device for forming a planar lipid-bilayer membrane for membrane protein analysis according to the aspect [12] or [13], the microinjection device further includes a cover for positioning the microinjection device relative to each chamber.

[15] The device for forming a planar lipid-bilayer membrane for membrane protein analysis according to the aspect [12] or [13] further includes a means for applying liposomes each containing a different protein to the respective chambers and simultaneously measuring the different kinds of proteins.

[16] The device for forming a planar lipid-bilayer membrane for membrane protein analysis according to the aspect [12] or [13] further includes a means for independently controlling the temperature of each chamber in an array, applying liposomes each containing a different protein to the respective chambers, and simultaneously measuring the proteins different in temperature.

[17] In the device for forming a planar lipid-bilayer membrane for membrane protein analysis according to the aspect [9], the aperture is provided with a taper so that the diameter of the aperture narrows from the lower side toward the upper side.

[18] In the device for forming a planar lipid-bilayer membrane for membrane protein analysis according to the aspect [9], the partition wall is formed of a silicon substrate and the aperture is formed by etching the silicon substrate.

[19] The device for forming a planar lipid-bilayer membrane for membrane protein analysis according to the aspect [10] further includes a means for measuring a property of the membrane protein by applying a voltage between the first thin-film electrode and the second thin-film electrode.

BEST MODE FOR CARRYING OUT THE INVENTION

According to the present invention, a planar lipid-bilayer membrane is formed: a microchannel is filled with a buffer solution, the microchannel being disposed under a horizontal partition wall having an aperture; a chamber being formed at a position corresponding to the aperture and provided with a liquid trap on the partition wall inside the chamber; a small amount of a lipid solution is applied as a droplet to the aperture filled with the buffer solution to form a thin layer of the lipid solution in a channel, and a buffer solution is applied as a droplet to the chamber from the upper side of the chamber to thereby form the planar lipid-bilayer membrane. Consequently, the amount of the lipid solution to be introduced to the chamber can be precisely controlled, and the planar lipid-bilayer membrane can be readily formed (reconstituted) with a high repeatability.

The present invention will now be described in detail with reference to the embodiments.

First Embodiment

Figure 1:
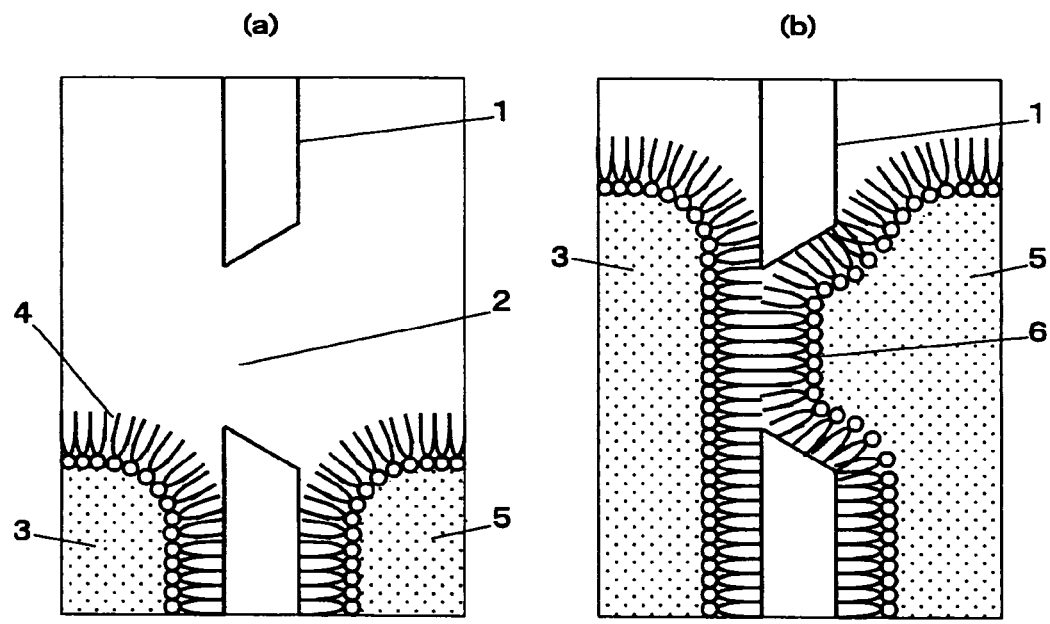
FIG. 1 is a schematic diagram showing a method of forming a planar lipid-bilayer membrane by the LB method.
Figure 2:
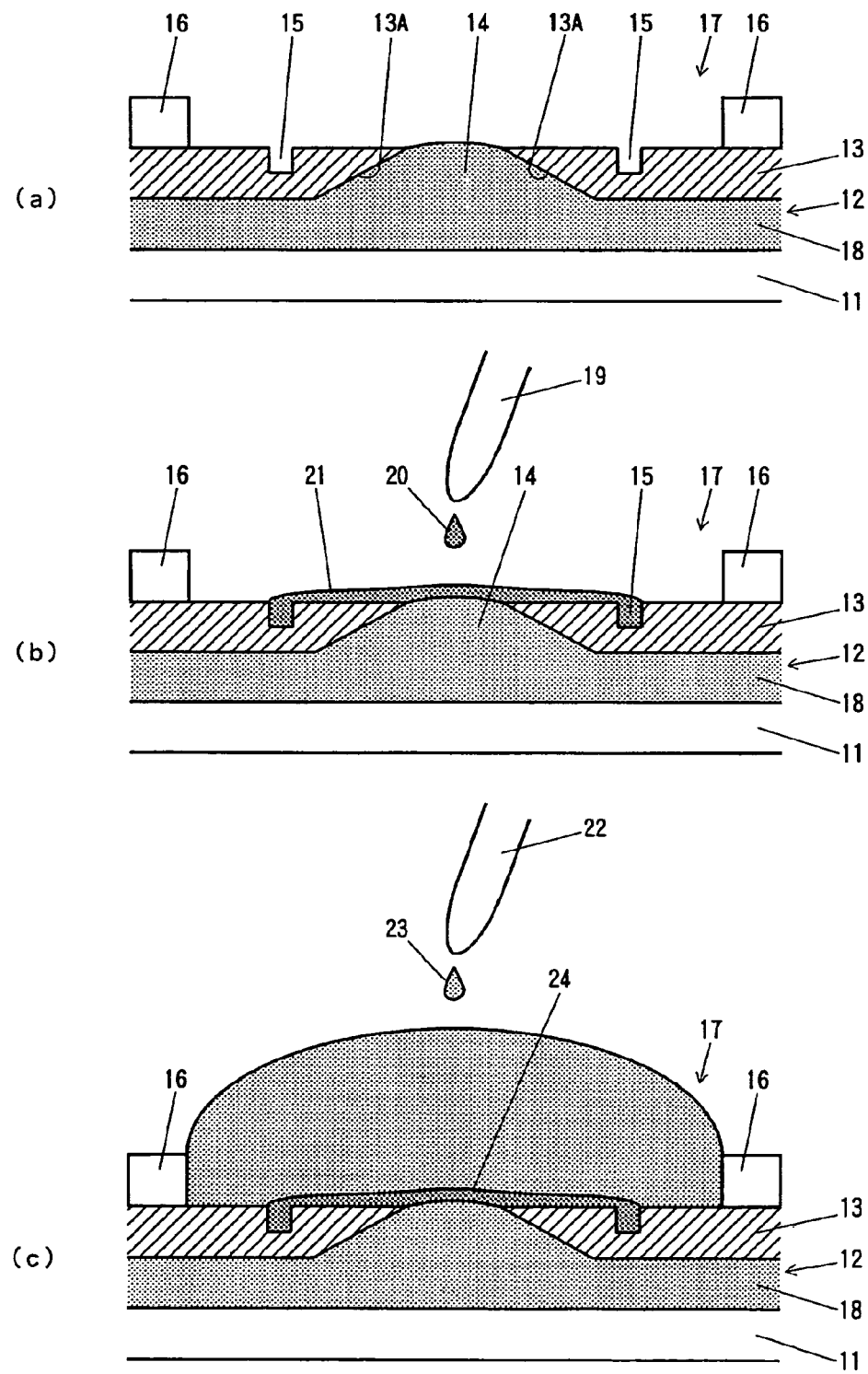
FIG. 2 is a schematic diagram of a device for forming a planar lipid-bilayer membrane according to a first embodiment of the present invention.
Figure 3:
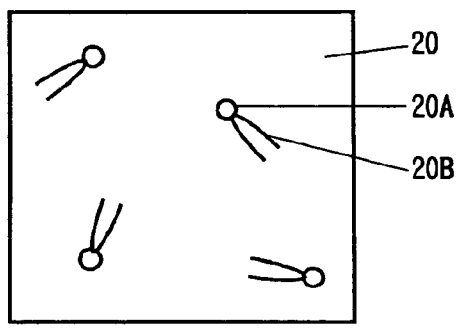
FIG. 3 is a schematic diagram of a lipid solution according to the present invention.
Figure 3:
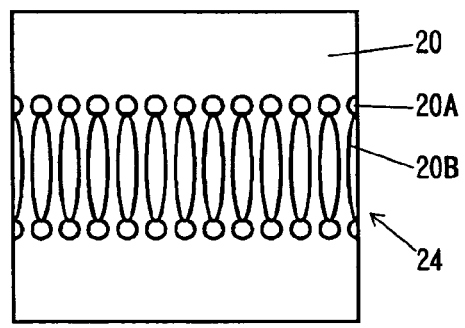

FIG. 2 is a schematic diagram of a device for forming a planar lipid-bilayer membrane according to a first embodiment of the present invention. FIG. 3 is a schematic diagram showing a lipid solution.

In FIG. 2, a reference numeral 11 denotes a glass substrate, a reference numeral 12 denotes a microchannel, a reference numeral 13 denotes a partition wall, a reference numeral 14 denotes an aperture (opening) provided to the partition wall 13, a reference numeral 15 denotes a liquid trap provided on the partition wall 13, a reference numeral 17 denotes a chamber defined by a well 16, a reference numeral 18 denotes a buffer solution which fills the microchannel 12 and the aperture (opening) 14, a reference numeral 19 denotes a microinjection device (microinjector), a reference numeral 20 denotes a lipid solution applied as a droplet from the microinjection device 19, a reference numeral 21 denotes a layer of the lipid solution, a reference numeral 22 denotes a microinjection device (microinjector or pipette) for applying a buffer solution as a droplet, a reference numeral 23 denotes a buffer solution applied as a droplet from the microinjection device 22, and a reference numeral 24 denotes a planar lipid-bilayer membrane.

In the device for forming (reconstituting) a planar lipid-bilayer membrane, as described above, the microchannel 12 and the chamber 17 are separated from each other by the partition wall 13 having the aperture (opening) 14.

Firstly, as shown in FIG. 2(a), the microchannel 12 and the aperture 14 are filled with the buffer solution 18 (KCl or aqueous solution). At this stage, the interface of the buffer solution 18 stops at the aperture (opening) 14 due to the surface tension. Here, the aperture (opening) 14 is provided with a taper 13A so that the diameter of the aperture 14 narrows from the lower side toward the upper side. Thus, the interface of the buffer solution 18 readily stops at the aperture (opening) 14.

Then, as shown in FIG. 2(b), the lipid solution 20 is applied as a droplet to the aperture (opening) 14 by using the microinjection device 19. At this stage, the excess of the lipid solution 20 flows into the liquid trap 15 provided at the periphery of the aperture (opening) 14. Accordingly, the layer (lipid solution layer 21) of the remaining lipid solution 20 at the interface of the buffer solution 18 can be sufficiently thinned (submicrometer order).

Lastly, as shown in FIG. 2(c), the buffer solution 23 is applied as a droplet to the chamber 17 by using the microinjection device 22, and thereby a planar lipid-bilayer membrane (thickness: about 10 nm) 24 is spontaneously formed.

As described above, (1) the microchannel 12 and the aperture 14 are filled with the buffer solution 18, (2) a small amount of the lipid solution 20 is applied as a droplet, and (3) the buffer solution 23 is applied to the chamber 17 as a droplet. As a result, a layer (lipid solution layer 21) of the lipid solution 20 is spontaneously assembled to a planar lipid-bilayer membrane 24.

Here, as shown in FIG. 3(a), the lipid solution 20 includes a component (phospholipids) having a hydrophilic group 20A and a hydrophobic group 20B. By thinning the lipid solution layer, as shown in FIG. 3(b), the hydrophobic group 20B is arranged to face inside, and engaged and bound to each other to form the planar lipid-bilayer membrane 24.

For forming the bilayer, the layer of the lipid solution must be thinned as much as possible (nm order). Then, a means for controlling the thickness of the layer by communication with the lipid trap 15 may be provided, as described below.

Second Embodiment

Figure 4:
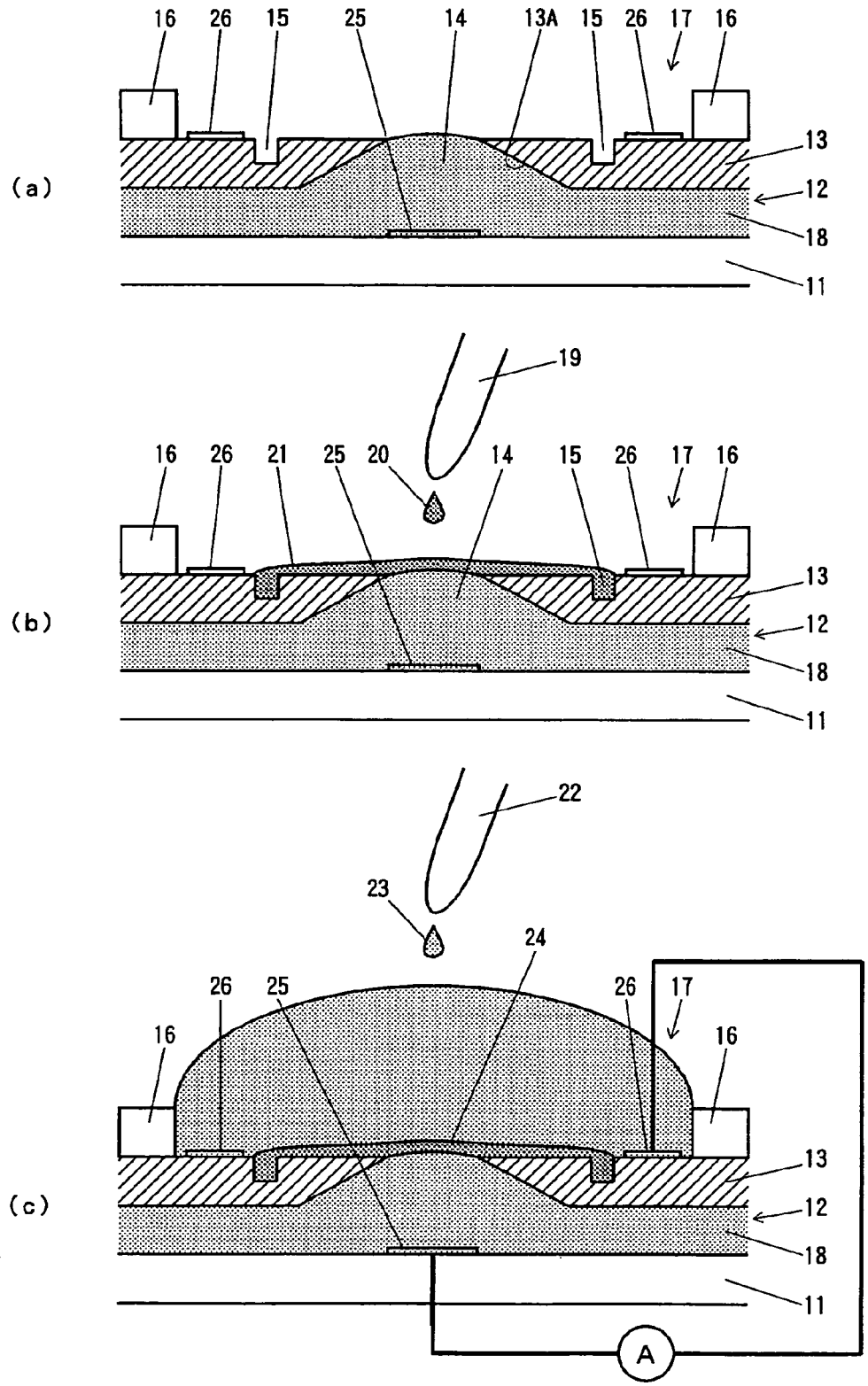
FIG. 4 is a schematic diagram of a device for forming a planar lipid-bilayer membrane according to a second embodiment of the present invention.

FIG. 4 is a schematic diagram of a device for forming a planar lipid-bilayer membrane according to a second embodiment of the present invention.

In a second embodiment, in addition to the components in the first embodiment, a first thin-film electrode 25 is provided on the glass substrate 11 of the microchannel 12 and a second thin-film electrode 26 is provided on the partition wall 13 within the chamber 17 defined by the well 16. Since the thin-film electrodes 25 and 26 are independently provided in the chamber 17 defined by the well 16, the membrane potential and current can be measured.

In order to incorporate a membrane protein to be analyzed into the planar lipid-bilayer membrane 24 formed at the interface of the buffer solution 18, a spherical vesicle (liposome) of the same lipid bilayer is used.

Figure 5:
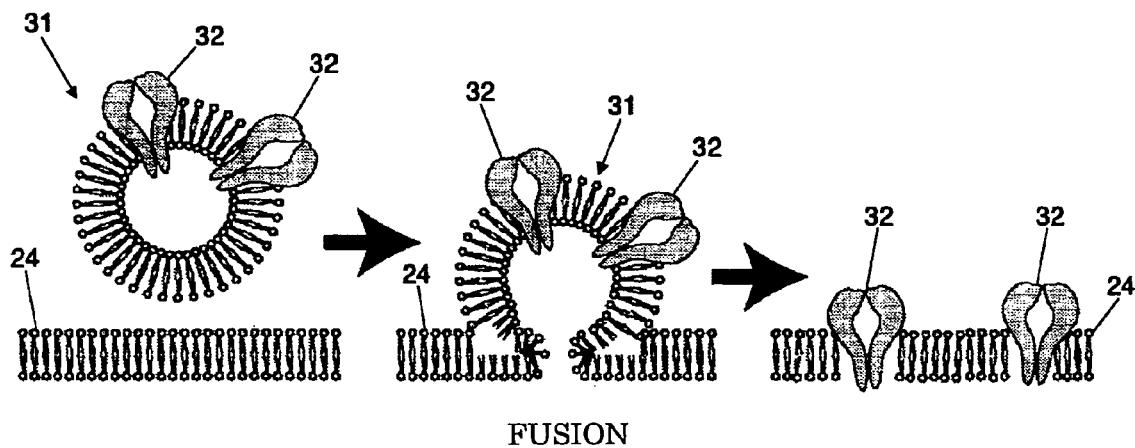
FIG. 5 is a diagram showing the incorporation of a membrane protein into a planar lipid-bilayer membrane by using a liposome according to the present invention.

As shown in FIG. 5, a liposome 31 containing Alamethicin 32 which is a channel protein is prepared. Droplets of the liposome is mixed in the buffer solution 23, and introduced to the planar lipid-bilayer membrane 24 as a droplet. The liposome 31 and the planar lipid-bilayer membrane 24 are spontaneously fused to each other by the contact of the liposome 31 with the planar lipid-bilayer membrane 24, and Alamethicin 32 is incorporated into the planar lipid-bilayer membrane 24. The present inventors have succeeded, as a test case, to insert Alamethicin into a planar lipid-bilayer membrane by fusing a liposome containing Alamethicin to the planar lipid-bilayer membrane formed by a known planar lipid-bilayer method. Alamethicin is a peptide that stochastically forms ion channels by oligomerization, changing transiently between its open and close states. The membrane current was measured with the addition of the buffer solution containing Alamethicin to confirm the fusion of the membrane protein (peptide) to the bilayer.

Third Embodiment

Figure 6:
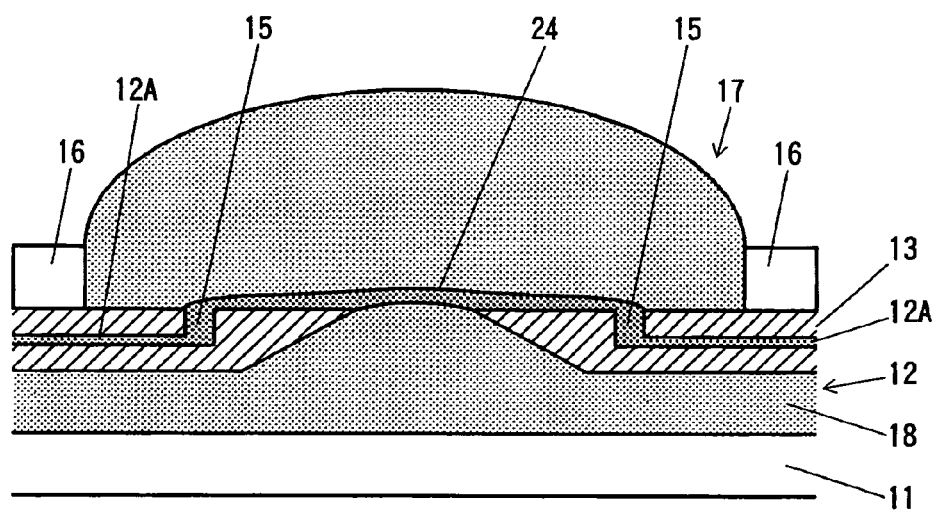
FIG. 6 is a schematic diagram of a device for forming a planar lipid-bilayer membrane according to a third embodiment of the present invention.

FIG. 6 is a schematic diagram of a device for forming a planar lipid-bilayer membrane according to a third embodiment of the present invention.

In this embodiment, the device is provided with a channel 12A connecting to the liquid trap 15. Therefore, it is possible to control the thickness of the layer of the lipid solution remaining on the interface of the buffer solution 18. In other words, when a thick lipid solution layer 21 is formed by the lipid solution 20 remaining on the interface of the buffer solution 18, the thickness of the lipid solution layer 21 can be decreased by sucking the excess of the lipid solution 20 through the channel 12A connecting to the liquid trap 15. Reversely, when a thin lipid solution layer 21 is formed by the lipid solution 20 remaining on the interface of the buffer solution 18, the thickness of the lipid solution layer 21 can be increased by pushing the lipid solution 20 back through the channel 12A connecting to the liquid trap 15.

Fourth Embodiment

Figure 7:
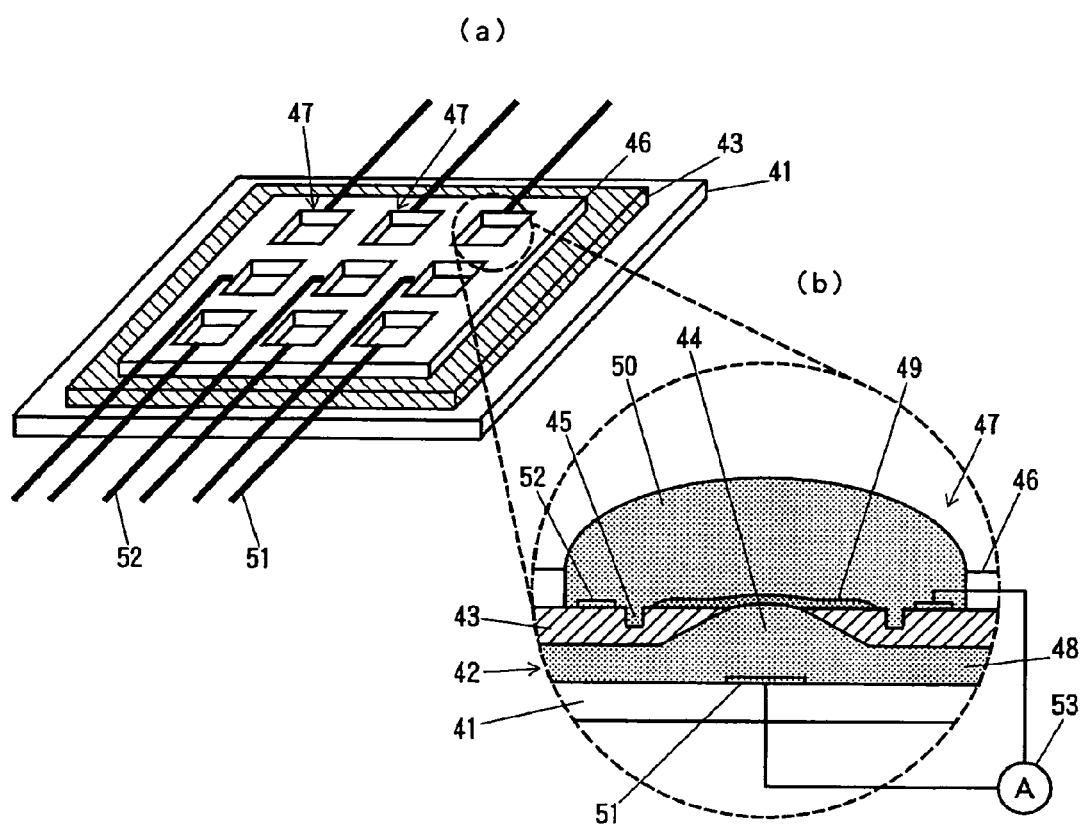
FIG. 7 is schematic diagrams of a device for forming a planar lipid-bilayer membrane according to a fourth embodiment of the present invention.

FIG. 7 is schematic diagrams of a device for forming a planar lipid-bilayer membrane according to a fourth embodiment of the present invention. FIG. 7(a) is a perspective view of the top face of chambers in an array. FIG. 7(b) is a cross-sectional view of a well array chip.

In the drawings, a reference numeral 41 denotes a glass substrate, a reference numeral 42 denotes a microchannel, a reference numeral 43 denotes a partition wall formed of silicon, a reference numeral 44 denotes an aperture formed by etching the partition wall 43, a reference numeral 45 denotes a liquid trap formed at the periphery of the aperture 44, a reference numeral 47 denotes a chamber defined by a well 46, a reference numeral 48 denotes a buffer solution which fills the microchamber 42 and the aperture 44, a reference numeral 49 denotes a planar lipid-bilayer membrane, a reference numeral 50 denotes a buffer solution applied as a droplet on the planar lipid-bilayer membrane 49, a reference numeral 51 denotes a first thin-film electrode disposed on the glass substrate 41 at the position under the aperture 44, a reference numeral 52 denotes a second thin-film electrode disposed at the periphery of the liquid trap 45, and a reference numeral 53 denotes a power source with ammeter disposed between the first thin-film electrode 51 and the second thin-film electrode 52. The partition wall 43 may be formed of an acrylic plastic instead of silicon. The acrylic plastic can be mechanically processed.

As described above, in this embodiment, the chambers 47 are each defined by a well 46 and disposed in an array.

Therefore, a plurality of kinds of membrane proteins can be simultaneously measured by applying liposomes each containing a different membrane protein to the respective chambers 47. The different membrane proteins are each incorporated into the respective planar lipid-bilayer membranes formed in an array according to this embodiment with a microinjection device for a reagent. Then, the membrane proteins are simultaneously measured with a multichannel system. For example, membrane proteins A and B are separately incorporated into different planar lipid-bilayer membranes. When a reagent which suppresses or activates either of these membrane proteins is applied to chambers through the channel, electric signals of the membrane proteins A and B are different from that of each other. In addition, another signal can be obtained by applying a reagent having another effect. Thus, a plurality of measurements can be simultaneously performed with a high sensitivity to analyze how the membrane proteins react to which reagents.

A measuring system (not shown) according to the present invention includes a planar lipid-membrane chip, an injection device for injecting a membrane protein (liposome), a syringe pump for injecting a reagent, an amplifier (patch amplifier) for amplifying small membrane current/voltage, and a computer for result analysis. Firstly, planar lipid-bilayer membranes are formed in an array according to the present invention. Liposomes each containing a different objective membrane protein are applied to the planar lipid-bilayer membranes with the microinjection device. The membrane currents/voltages when various reagents are applied to each membrane protein through the microchannel are measured by using the thin-film electrodes, and signals amplified by the amplifier are incorporated into the computer. The computer analyzes the output signals. Thus, identification and functional analysis of each membrane protein can be performed.

In addition, the temperature of each chamber in an array may be independently controlled. Liposomes each containing a different membrane protein are applied to the planar lipid-bilayer membranes. Thus, the proteins different in temperature may be simultaneously measured. In such a case, a heating device (not shown) is provided to each chamber.

Figure 8:
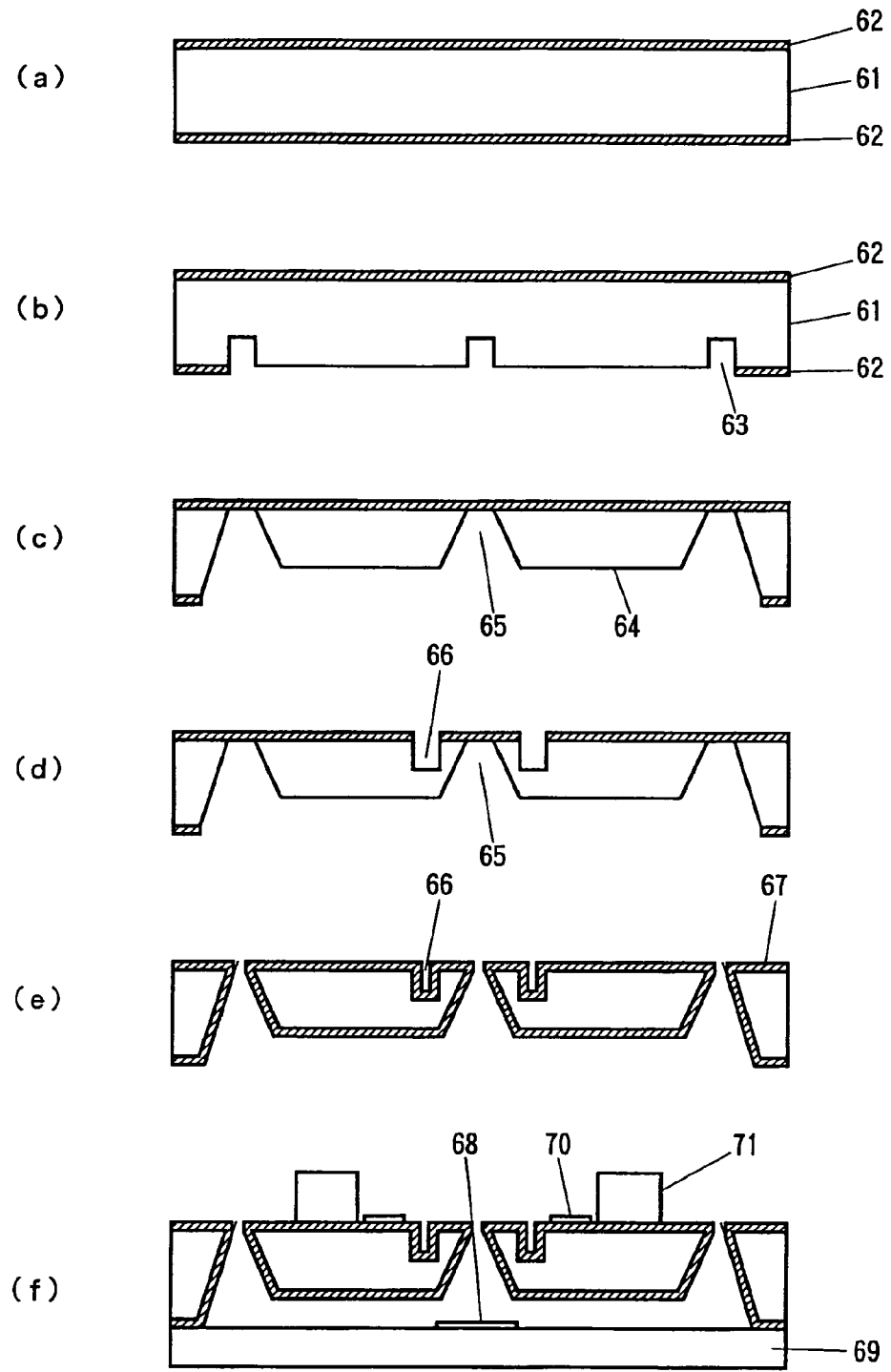
FIG. 8 is cross-sectional views of a well array chip of the devices for forming planar lipid-bilayer membranes in a fabrication process thereof according to the fourth embodiment of the present invention.

FIG. 8 is cross-sectional views of a well array chip of the devices for forming planar lipid-bilayer membranes in a fabrication process thereof according to the fourth embodiment of the present invention.

(1) Firstly, as shown in FIG. 8(a), oxide films 62 are formed on the top and bottom faces of a silicon substrate 61.

(2) Then, as shown in FIG. 8(b), one of the oxide films 62 is patterned and tiny holes (50 to 100 μm in width and 200 μm in depth) 63 are formed by reactive ion etching.

(3) Then, as shown in FIG. 8(c), a microchannel 64 and an aperture 65 are etched using tetramethylammonium hydroxide (TMAH).

(4) Then, as shown in FIG. 8(d), a liquid trap 66 is formed at the periphery of the aperture 65 by etching the oxide film 62 and the silicon substrate 61.

(5) Then, as shown in FIG. 8(e), the entire chip is coated with Parylene C 67 for the electrical insulation.

(6) Finally, as shown in FIG. 8(f), a lower electrode 68 and a glass substrate 69 are bonded to the bottom side. On the top side, an upper electrode (Au) 70 is patterned and a well 71 is formed of a resist (SU8: product name) of 40 μm in thickness.

Figure 9:
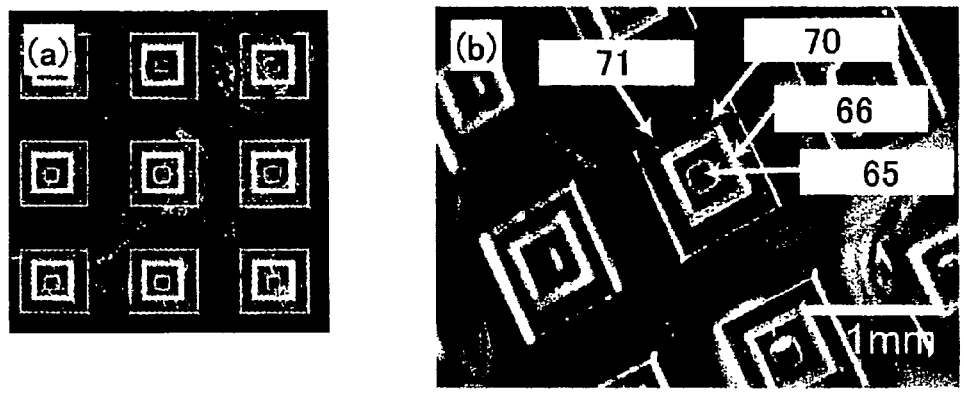
FIG. 9 is enlarged plan views of a part of an array of the devices for forming planar lipid-bilayer membranes according to the fourth embodiment of the present invention.

FIG. 9 is an enlarged plan view of a part of an array of the devices for forming planar lipid-bilayer membranes according to the fourth embodiment of the present invention. FIG. 9(a) shows an array chip, and FIG. 9(b) shows an enlarged view of the chip.

In these drawings, apertures 65 are each surrounded by a liquid trap 66 formed in a shape of a square trench. At the periphery of each liquid trap 66 formed in a shape of a square trench, an upper electrode 70 is disposed. SU8 wells 71 are formed so as to define each chamber.

Here, in the drawings, the size of the aperture 65 formed at the center is 200 μm, the size of the well 71 is 900 μm. The size and depth of the liquid trap 66 are 500 μm and 40 μm, respectively. The capacity of the liquid trap 66 is 8 nL (8 nanoliters). The upper electrodes 79 are electrically separated for each chamber and the lower electrode 68 is common to all chambers.

Fifth Embodiment

Figure 10:
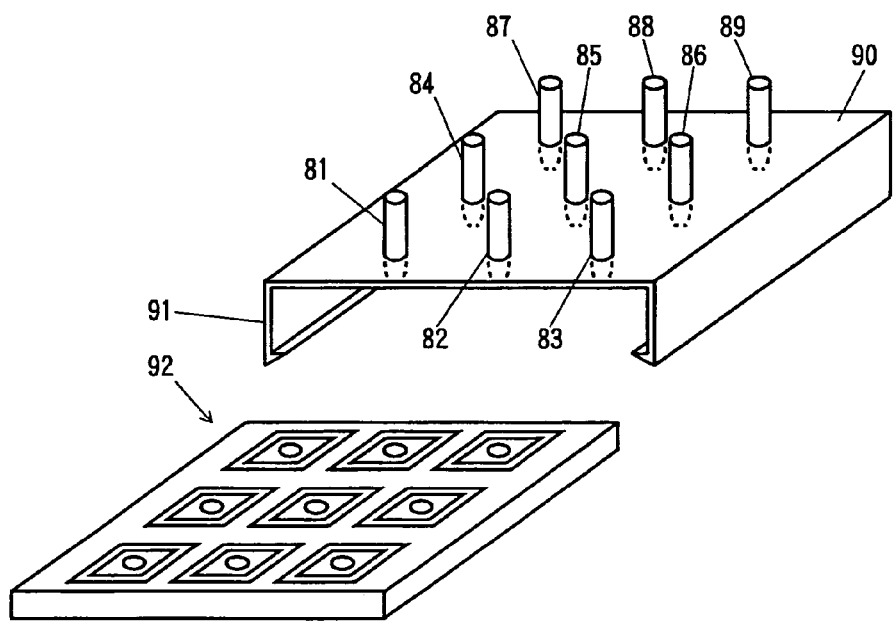
FIG. 10 is a perspective view of a microinjection device of an array of the devices for forming planar lipid-bilayer membranes according to a fifth embodiment of the present invention.

FIG. 10 is a perspective view of a microinjection device of an array of the devices for forming planar lipid-bilayer membranes according to a fifth embodiment of the present invention.

In this drawing, reference numerals 81 to 89 denote nozzles of the microinjection device. Each of the nozzles corresponds to the respective chambers of a well array chip 92. A reference numeral 90 denotes a cover integrated with the nozzles. The cover is provided for positioning the nozzles 81 to 89 of the microinjection device relative to each chamber of the well array chip 92. A reference numeral 91 denotes an engaging member for engaging the cover with the well array chip 92 for the positioning.

The drying of the planar lipid-bilayer membrane disadvantageously affects the measurement. By immediately installing the cover 90 to the well array chip 92 after the production of the planar lipid-bilayer membranes containing membrane proteins, the drying of the planar lipid-bilayer membranes in an array can be reduced.

During the measurement, the drying of buffer solutions in the chambers can be avoided by optionally applying a buffer solution as a droplet to each chamber through the respective nozzles 81 to 89 of the microinjection device.

The present invention is not limited to the above-mentioned embodiments. Various modifications based on the concept of the present invention are possible and are within the scope of the present invention.

According to the present invention, the following advantageous effects are achieved:

(1) The device for forming a planar lipid-bilayer membrane for membrane protein analysis includes a substrate, a partition wall disposed over the substrate so as to be parallel to the substrate, a microchannel defined by the substrate and the partition wall, and a chamber having an aperture provided to the partition wall and a liquid trap formed at the periphery of the aperture. The amount of a lipid solution can be precisely controlled and injected to the chamber from the upper side of the chamber with a microinjection device (microinjector). Planar lipid-bilayer membranes with high repeatability can be readily formed (reconstituted).

(2) Since the apertures and chambers disposed in an array are independent to each other as a measurement system, many kinds of measurements can be simultaneously conducted. Therefore, fast membrane protein analysis can be achieved.

(3) Since the measurement system and the channel for injecting a reagent are fabricated in a microscale (less than 1 mm), the dead volume is considerably reduced to significantly decrease the amounts of the reagent and the sample of necessary.

(4) Since the size of the measurement system is very small, the measurement is not easily affected by external electric noise. Thus, the electrical measurement can be further precisely performed.

INDUSTRIAL APPLICABILITY

The present invention is suitable for biotechnology, biochips, membrane protein analysis, drug discovery screening, and biosensors, and can be applied to an ultrasensitive membrane-protein analysis device, an ultrasensitive multichannel drug discovery screening device, and an ultrasensitive ion sensor.

The invention claimed is:

1. A method of forming a planar lipid-bilayer membrane for membrane protein analysis, the method comprising:
(a) filling a microchannel with a first buffer solution, the microchannel being disposed under a horizontal partition wall having a tapered aperture, such that the tapered aperture narrows from the lower side to the upper side;
(b) applying a small amount of a lipid solution as a droplet to the aperture filled with the buffer solution to form a thin layer of the lipid solution in a chamber, the chamber being formed at a position corresponding to the aperture of the partition wall and being provided with a liquid trap on the partition wall inside the chamber, wherein the liquid trap is a trench formed at the periphery of the aperture that thins the lipid solution added above the aperture; and
(c) applying a second buffer solution as a droplet to the chamber from the upper side of the chamber, thereby forming a planar lipid-bilayer membrane,
wherein the first buffer solution and the second buffer solution are the same or different, and
wherein the lipid solution comprises unarranged phospholipids, each of which having a hydrophilic group and a hydrophobic group, and which form the planar lipid bilayer upon the applying of the second buffer solution in (c).

2. The method of claim 1, wherein a thickness of the thin layer of the lipid solution is controlled.

3. The method of claim 1, wherein the buffer solution comprises a liposome, which is a spherical vesicle of a lipid-bilayer membrane, incorporated with an objective membrane protein, and the liposome is fused with the planar lipid-bilayer membrane to incorporate the membrane protein into the planar lipid-bilayer membrane.

4. The method of claim 1, wherein a plurality of the chambers are integrally formed.

5. The method of claim 4, wherein the plurality of the chambers are formed in an array.

6. The method of claim 4, wherein liposomes each comprising a different protein are each applied to a different chamber, and different kinds of proteins are simultaneously measured.

7. The method of claim 4, wherein a reaction and/or binding of different kinds of reagents or different kinds of proteins in each of the chambers is simultaneously measured.

8. The method of claim 4, wherein a temperature of each chamber is independently controlled, liposomes each comprising a different protein are each applied to a different chamber, and the proteins different in temperature are simultaneously measured.

9. A device for forming a planar lipid-bilayer membrane for membrane protein analysis, the device comprising:
(a) a substrate;
(b) a partition wall disposed over the substrate so as to be parallel to the substrate;
(c) a microchannel defined by the substrate and the partition wall;
(d) a chamber provided with an aperture formed in the partition wall and a liquid trap, which is a trench formed at the periphery of the aperture that thins the lipid solution added above the aperture; and
(e) a microinjection device for applying droplets of a lipid solution and a buffer solution to the chamber from the upper side of the chamber,
wherein the aperture is tapered, such that the diameter of the aperture narrows from the lower side toward the upper side.

10. The device according to claim 9, further comprising a first thin-film electrode disposed on the substrate at a position corresponding to the chamber and a second thin-film electrode disposed near the liquid trap.

11. The device according to claim 9, wherein the partition wall has a channel connected to the liquid trap for controlling the thickness of a layer of the lipid solution.

12. The device according to claim 9, wherein a plurality of chambers are integrally formed.

13. The device according to claim 12, wherein the plurality of the chambers are formed in an array.

14. The device according to claim 12, wherein the microinjection device further comprises a cover for positioning the microinjection device relative to each chamber.

15. The device according to claim 12, further comprising a means for applying liposomes, each comprising a different protein, to the respective chambers and simultaneously measuring the different kinds of proteins.

16. The device according to claim 12, further comprising a means for independently controlling the temperature of each chamber in an array, applying liposomes, each comprising a different protein, to the respective chamber, and simultaneously measuring the proteins different in temperature.

17. The device according to claim 9, wherein the partition wall is formed of a silicon substrate and the aperture is formed by etching the silicon substrate.

18. The device to claim 10, further comprising a means for measuring a property of the membrane protein by applying a voltage between the first thin-film electrode and the second thin-film electrode.

19. The method of claim 1, wherein the lipid solution comprises no arranged phospholipids in the form of a liposome or lipid bilayer.

20. The method of claim 1, wherein the second buffer solution is different from the first buffer solution.

* * * * *